US009527304B2

(12) United States Patent
Bauer

(10) Patent No.: US 9,527,304 B2
(45) Date of Patent: Dec. 27, 2016

(54) METHOD FOR PRODUCING A COMPONENT WITH A PRINTED REAL-WOOD SURFACE AND A COMPONENT PRODUCED ACCORDING TO THE METHOD

(75) Inventor: Joerg R. Bauer, Weingarten (DE)

(73) Assignee: INTERGLARION LIMITED, Engomi, Nikosia (CY)

( * ) Notice: Subject to any disclaimer, the term of this patent is extended or adjusted under 35 U.S.C. 154(b) by 1988 days.

(21) Appl. No.: 12/595,439

(22) PCT Filed: Apr. 9, 2008

(86) PCT No.: PCT/EP2008/002798
§ 371 (c)(1),
(2), (4) Date: Oct. 9, 2009

(87) PCT Pub. No.: WO2008/125261
PCT Pub. Date: Oct. 23, 2008

(65) Prior Publication Data

US 2010/0068481 A1 Mar. 18, 2010

(30) Foreign Application Priority Data

Apr. 13, 2007 (DE) ........................ 10 2007 017 503

(51) Int. Cl.
*B32B 3/00* (2006.01)
*B32B 3/10* (2006.01)
(Continued)

(52) U.S. Cl.
CPC ................ *B41J 3/407* (2013.01); *B44C 5/043* (2013.01); *B44F 9/02* (2013.01); *Y10T 428/24802* (2015.01)

(58) Field of Classification Search
None
See application file for complete search history.

(56) References Cited

U.S. PATENT DOCUMENTS 4,156,038 A * 5/1979 Fock et al. .................... 427/210
4,391,013 A * 7/1983 Janssen ........................ 15/210.1
(Continued)

FOREIGN PATENT DOCUMENTS

DE 100 31 030 1/2002
DE 600 09 141 10/2004
(Continued)

OTHER PUBLICATIONS

Machine Translation of Bauer (DE 103 23 412) (no date available).*
Human Translation of Bauer (DE 10323412) (Jun. 2014).*

*Primary Examiner* — Lisha Jiang
(74) *Attorney, Agent, or Firm* — Greenblum & Bernstein, P.L.C.

(57) ABSTRACT

A method for producing a component with a real-wood surface. The method includes supplying an original and inputting into an electronic data processing system original data related to an appearance of a surface of the original. Additionally, the method includes supplying a timber having a pore structure corresponding to that of a predetermined type of wood and printing a surface of the timber using an inkjet printing method in accordance with the original data such that a three-dimensional surface structure of timber determined by the pore structure is at least partly retained. The component has an appearance corresponding to the appearance of the surface of the original, has a grain and the pore structure corresponding to the predetermined type of wood, and has a predetermined coloration.

21 Claims, 3 Drawing Sheets

(51) Int. Cl.

| | |
|---|---|
| ***B32B 3/30*** | (2006.01) |
| ***B32B 5/00*** | (2006.01) |
| ***B41J 3/407*** | (2006.01) |
| ***B44C 5/04*** | (2006.01) |
| ***B44F 9/02*** | (2006.01) |

(56) References Cited

U.S. PATENT DOCUMENTS

| | | | | |
|---|---|---|---|---|
| 6,465,046 | B1 | 10/2002 | Hansson et al. | |
| 6,551,694 | B1 * | 4/2003 | Imamichi et al. | 428/195.1 |
| 6,565,919 | B1 | 5/2003 | Hansson et al. | |
| 6,685,993 | B1 | 2/2004 | Hansson et al. | |
| 6,991,830 | B1 | 1/2006 | Hansson et al. | |
| 7,477,962 | B2 | 1/2009 | Osumi et al. | |
| 2002/0054302 | A1 * | 5/2002 | Nakamura | 358/1.2 |
| 2003/0207083 | A1 * | 11/2003 | Hansson et al. | 428/143 |
| 2004/0028830 | A1 | 2/2004 | Bauer | |
| 2004/0139673 | A1 * | 7/2004 | Luetgert et al. | 52/313 |
| 2005/0108984 | A1 | 5/2005 | Osumi et al. | |
| 2005/0249929 | A1 * | 11/2005 | Reichwein et al. | 428/211.1 |
| 2006/0176318 | A1 * | 8/2006 | Martin et al. | 345/629 |
| 2006/0288885 | A1 * | 12/2006 | Park | 100/234 |
| 2007/0221344 | A1 * | 9/2007 | Beach et al. | 160/236 |

FOREIGN PATENT DOCUMENTS

| | | |
|---|---|---|
| DE | 103 23 412 | 12/2004 |
| DE | 10 2004 051828 | 6/2005 |

* cited by examiner a)
20
16
14
10
18
12
b)
16
14
18
10
12
22 c)
18
24
14
22
10
12
d)
18
28
26
30
+3
+2
+1
-T
e)
32
10

40
42
44
50
46
48

METHOD FOR PRODUCING A COMPONENT WITH A PRINTED REAL-WOOD SURFACE AND A COMPONENT PRODUCED ACCORDING TO THE METHOD

CROSS REFERENCE TO RELATED APPLICATIONS

The present application is a U.S. National Stage of International Application No. PCT/EP2008/002798 filed Apr. 9, 2008, which published as WO 2008/125261 A1 on Oct. 23, 2008, the disclosure of which is expressly incorporated by reference herein in its entirety. Further, this application claims priority under 35 U.S.C. §119 and §365 of German Application No. 10 2007 017 503.7 filed Apr. 13, 2007.

BACKGROUND OF THE INVENTION

1. Field of the Invention

The invention relates to a method for producing a component with a real-wood surface, which is printed by an inkjet printing method such that its appearance corresponds to that of an original with a grain and pore structure corresponding to a predetermined desired type of wood and a predetermined coloration. The invention further relates to a component produced according to a method according to the invention.

2. Background Description

Real-wood surfaces are becoming increasingly popular, whether in furniture, kitchens, wood applications in automobiles, etc. Surfaces of precious woods, in particular tropical precious woods, are particularly popular. The consumption of woods of this type, which in general are slow growing, leads to serious ecological disadvantages. It is therefore known, for example, from DE 103 23 412 A1, to provide components with real-wood surfaces of woods that are less valuable and, for example, grow again quickly in plantations and to print them by an inkjet printing method such that they are given an appearance that corresponds to that of the surface of a precious wood.

A method is known from DE 103 23 412 A1 for producing a flat component with a predetermined surface appearance, in which a flat component with a surface composed of wood is printed by a printing method that can be programmed with respect to the resulting appearance to embody a predetermined pattern, the appearance of which corresponds to a predetermined type of wood with a predetermined coloration.

DE 600 09 141 T2 describes a method for producing a decorative surface on surface elements, in which a segmentation pattern is embodied, the segmentation of which has at least two decorative segments on each surface element. Furthermore, for each segment a segment decorative surface is selected from a group that comprises a digitalized and simulated representation of different types of wood, minerals, stones, etc. Each selection is made at a terminal, at which a selection is made from a database that is displayed on the terminal.

A method is known from DE 10 2004 051 828 A1 for producing a decorative wood material, in which an image of a surface of a wood material is stored, the surface of the wood material is bleached and, after electronic processing, for example, suppressing spots on the surface, the stored image is printed on the bleached surface in a congruent manner.

SUMMARY OF THE INVENTION

The aim of the invention is to create a method for producing a component with a real-wood surface, in particular a real-wood surface of an inexpensive timber, which is printed by an inkjet printing method such that its appearance corresponds as far as possible to the appearance of a surface of a predetermined desired wood, in particular a precious wood, optionally in a predetermined coloration corresponding to a customer's request.

This aim is attained with a method for producing a component with a real-wood surface, which is printed by an inkjet printing method such that its appearance corresponds to that of an original with a grain and pore structure corresponding to a predetermined desired type of wood and a predetermined coloration, containing the following steps: providing the original, entering original data showing the appearance of the surface of the original into an electronic data processing system, providing a component with a timber surface, the pore structure of which is similar to that of the predetermined desired type of wood and printing the timber surface in an inkjet printing method according to the original data such that the three-dimensional surface structure of the timber surface determined by the pore structure is at least partly retained.

Dependent claims are directed at advantageous implementation methods and further developments of the method according to the invention.

A further aim is attained with a component produced according to the method of the invention.

BRIEF DESCRIPTION OF THE DRAWINGS

The invention is explained below by way of example and with more details based on diagrammatic drawings.

The figures show.

DETAILED DESCRIPTION OF THE INVENTION

Figure 1:
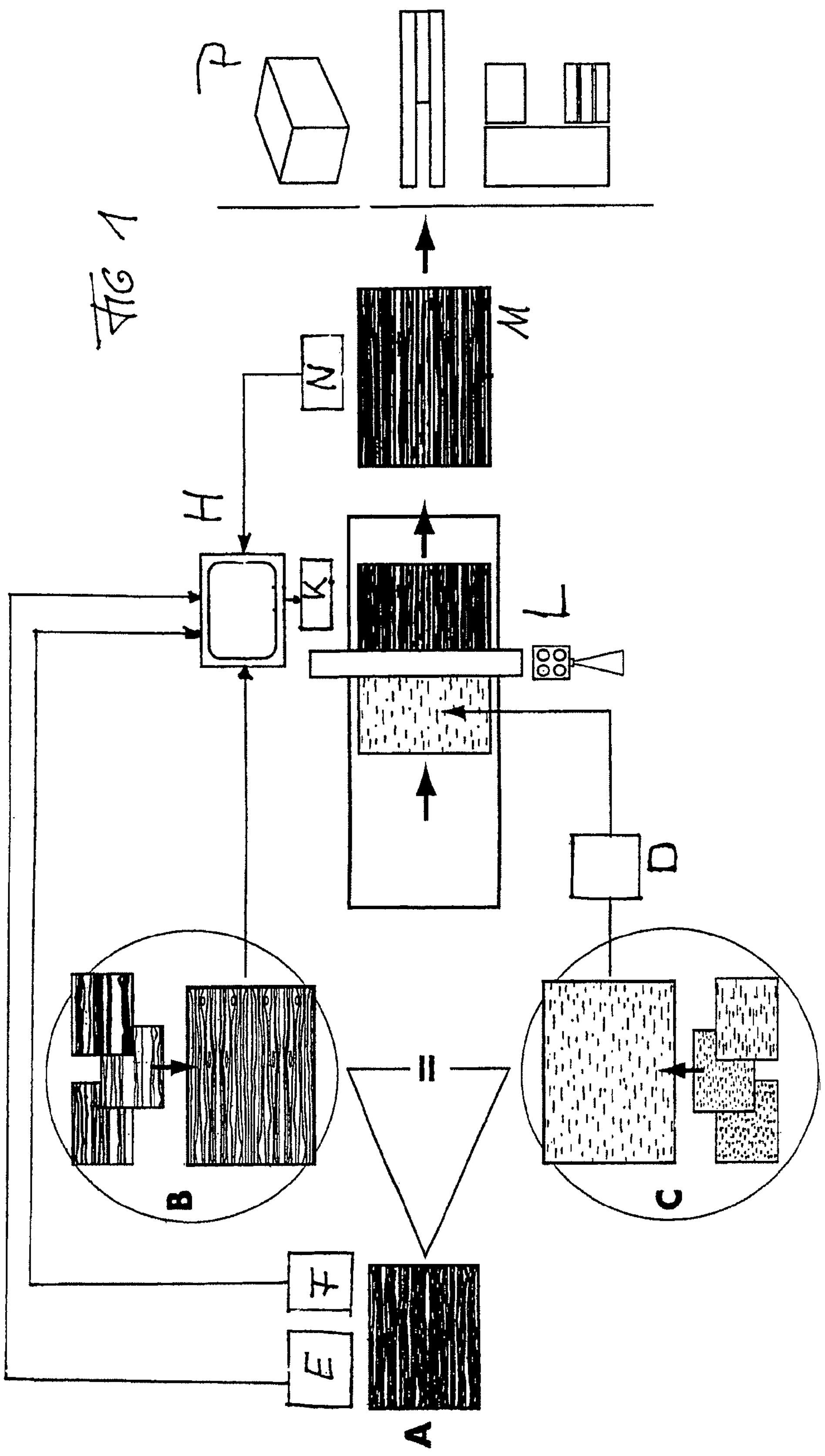
FIG. 1 A schematic representation of a system for producing components according to the invention to explain different steps for carrying out the method according to the invention.

A system for producing a printed component using the method according to the invention is sketched in FIG. 1.

A indicates a customer request original, the appearance of which corresponds to what a customer would like. The appearance of the surface of a customer request original A can be described with respect to a predetermined desired type of wood through its grain, which is essentially given through the linear pattern of the wood, the pore structure, which indicates the pore size, pore density, etc., and the coloration of the surface, indicated essentially by the coloration of the palest, the medium and the darkest areas according to color and contrast.

B indicates a stock of desired wood pattern data records, which essentially contain grain images of different types of wood, above all, precious types of wood.

C indicates a timber store, in which inexpensive types of wood, for example, in the form of cut veneers or peeled veneers with a thickness between 0.25 mm to 8 mm, are stored or are available in the form of components to be printed with surfaces of the timber.

D indicates a station for pretreating the timber surfaces to be printed later.

E indicates a station for scanning in the grain of the customer original A.

F indicates a station for recording the coloration of the customer original.

H indicates an electronic data processing system in which entered data can be processed according to generally known data processing programs with respect to coloration, contrast, formats, etc.

K indicates a control device, activated by the electronic data processing system, for an inkjet printing device.

N indicates a recording station for recording the appearance of the surface of a sample pattern M printed in the inkjet station L.

P indicates a station for assembling the components.

Aspects of the above-referenced stations and their interaction are described below. The invention can be used for almost all components with real-wood surfaces, such as lightweight building boards, furniture, flooring, façade panels or support panels, wherein these components can be composed of solid wood or can contain the real-wood surface in the form of a veneer applied to a base body of different material.

It is assumed that the customer request original A corresponds in its appearance to a precious wood (desired wood) colored in a natural or predetermined manner.

Based on the type of desired wood, which can be determined from the grain of the original recorded by scanning (scanning station E) and comparison to a wood type grain file, an inexpensive type of timber from a file is established under the following aspects:

The pore structure of the timber must be as similar as possible to the pore structure of the desired wood. Furthermore, the timber should be as homogeneous in color as possible and have only slight texture. The natural coloration of the timber should not be darker than that of the desired wood. Sapwoods are preferred as timber because of their low-contrast through coloration.

Under the above-mentioned aspects an inexpensive timber is selected from the timber store C, which timber can be identical to the desired wood in the case of an inexpensive desired wood.

Hardwoods with a light base color, which grow in North America, Europe or Asia, and which are suitable as timber are, for example, ash (consistent, low-contrast, pale coloration with marked pore grooving; good hardness, quick growth), birch (very pale coloration, low-contrast, quick growth, particularly suitable for mirror effects due to shiny stripes), linden and maple. Hardwoods with a pale base color, which grow in Africa, South America, Asia and Australia, are, for example, limba, koto and eucalyptus. These hardwoods are very suitable as timber because of their continuous growth and low-contrast coloration.

Hardwoods with a muted base color, which grow in North America, Europe and Asia, are beech (low-contrast, average growth, good hardness, consistent regular pore grooving, particularly suitable for dark patterns), oak, elm, alder, and poplar. A hardwood with muted base color, which grows in Africa, South America, Asia and Australia, is gabon, which is characterized by uniform pore structure and a muted homogeneous coloration.

Softwoods with a pale base color are pine, spruce, fir and Douglas fir.

The surfaces of the timber to be printed later do not necessarily have to be flat, they can be arched, such as is necessary, for example, for applications in automobiles. The timber can be applied onto edges flowing over corners, curvatures and areas.

The desired wood should be darker at its palest location than the base wood. For example, the timber ash can be printed with rosewood or zebrawood as the desired wood, or the timber gabon can be printed with mahogany.

It is also possible to print a darker pattern of the same wood on a pale timber, for example, to print copper beech as the desired wood on the timber beech, or to print bog oak as the desired wood on the timber oak. Furthermore, it is possible to print another dyed wood pattern as a desired wood on a timber, for example, a stone pine dyed blue on the timber birch or a white limed pine as the desired wood on the timber ash.

The timber should be an inexpensive wood, the consumption of which is unobjectionable in terms of renewability. As timber, a wood material veneer can also be used, which is produced by gluing or connecting scrap woods which are compressed to form a block in the same fiber direction and subsequently are cut to form cut veneers or peeled veneers. A wood material of this type has a consistent coloration with specific pore structure depending on the woods used.

The selection of the timber can be carried out automatically, in that the relevant data for the customer request original, such as grain and/or pore structure, are scanned, the desired type of wood is determined therefrom, the type of timber that best matches the desired wood type under the aspects set forth above is determined from the desired wood type from a file, or a timber type with a suitable pore structure is determined directly based on the pore structure of the customer request original.

Once a type of timber that is compatible with the customer request has been selected, a corresponding component to be further processed is provided from the timber store C and subjected to a pretreatment in the pretreatment station D, in which it is prepared for the inkjet imprint. This pretreatment concerns the physical and the chemical preparation of the timber surface according to the subsequent intended use. Depending on the intended use, the following properties, for example, can be achieved by the introduction of liquids into the surface of the timber later to be printed:

- Increase in the pressure load capacity through the inclusion of hardening substances or the addition of mineral-containing, e.g., corundum-like substances to a base liquid,
- Protection against biotic influences through the addition of corresponding substances to the base liquid,
- Resistance to environmental effects, in particular through pH value adjustment,
- UV stabilization in the wood core and the surface, in particular so that no color changes occur or lignin is released,
- Suppression of the hygroscopic properties by filling the finest-capillary fiber material with optionally hardening filler substances,
- Stopping wood shrinkage,
- Increased bending property through the insertion of plastics that remain flexible after polymerization.

The pretreatment is carried out as follows, for example:

The timber is first dried so that it absorbs the functional liquid well which gives it the desired properties.

After drying, the surface can be sandblasted or brushed in the fiber direction so that the three-dimensionality of the wood structure is reinforced.

The respective functional liquid is then applied, wherein depending on the desired properties, the base wood can be fully impregnated or is only surface treated with the functional liquid.

In any case, it must be ensured that the functional liquid is low enough in viscosity and is designed such that after it dries it does not completely fill the pores of the timber exposed on the surface or the inner channels or pores thereof. The functional liquid can be based on synthetic resin, water or other solvent (nitro) and can contain its constituents that give the timber the desired function in a dissolved form or in the form of sufficiently finely distributed particles, e.g., also in the form of nanoparticles.

After the functional fluid has been dried, the wood surface is finely sanded in several stages, wherein it can be dampened before the last fine sanding, so that fibers swelling out due to the moisture are also sanded off. Thus, during the subsequent inkjet printing no fibers protrude and the surface quality is maintained. The surface is already carefully cleaned of sanding residue between the sanding steps, but imperatively after the last sanding step, so that the three-dimensionality of the surface is exposed and the surface does not exhibit any impurities.

After the pretreatment, a component provided with the pretreated timber surface or at least a sample of the timber surface is fed to the inkjet station L.

The production of the desired-wood sample data records B, which are a stored in a corresponding database B, is explained below. Typical desired-wood samples are mahogany, teak, rosewood, makassar, gapelli, iroko/kambala, framiere, sapele, amaranth, abachi, makore, wenge, bongossi, afzelia, baukirai, walnut, stone pine, bog oak, eucalyptus, olive, European oak, etc. The desired wood patterns are obtained by scanning a pattern surface of the desired wood surfaces, wherein the respective desired wood surface can be present as a veneer. Before scanning, the surface is finely sanded in several steps, similar to the timber surface to be printed, wherein a moistening can be carried out before a last fine sanding, upon which a wet-on-wet sanding can then be carried out. In turn, the sanded surface is carefully rid of sanding residue so that the pore structure or three-dimensionality of the surface of the desired wood is exposed. Subsequently, the desired wood surface is scanned in, wherein the scanned in data above all contain the grain of the surface in the form of the grain lines and of their contrast. During scanning in, only halftones and mid-tones of the surface are preferably recorded. For example, a SCAN program "SilverFast," which is known per se, can be used.

The respective desired-wood pattern data record can be automatically selected from the data record stock B by a comparison of the grain of the original A scanned in in a step E, in that a pattern data record that comes closest to the grain of the original A is selected from the stock B.

A desired wood sample data record is thus preferably used in the electronic data processing system H, which is produced from a real desired wood surface after the surface processing thereof by scanning according to the method described above. This desired wood pattern data record is processed with color data which are determined by recording reference tone values of the surface of the customer request original A by color densitometer measurement. The reference tone values can be, for example, cyan, magenta, yellow and black, the proportions of which are measured and with which the selected desired wood pattern data record for producing a control data record for the control device K of the inkjet printing device L according to generally known programs such as are used in the graphics industry, are mixed. For example, an image processing program known under the name ADOBE® PHOTOSHOP® can be used. (Adobe and Photoshop are either registered trademarks or trademarks of Adobe Systems Incorporated in the United States and/or other countries.)

Alternatively, a data record that is obtained by fully scanning in the customer request original can also be used directly for controlling the inkjet printing device.

Once a print data record produced from the desired wood pattern data record and the color data or a print data record produced directly by scanning in the customer request original A is available in the data processing system, a sample pattern M is printed in the inkjet method. The ink liquid quantities are thereby set such that the three-dimensionality of the surface of the sample pattern is maintained.

Figure 2:
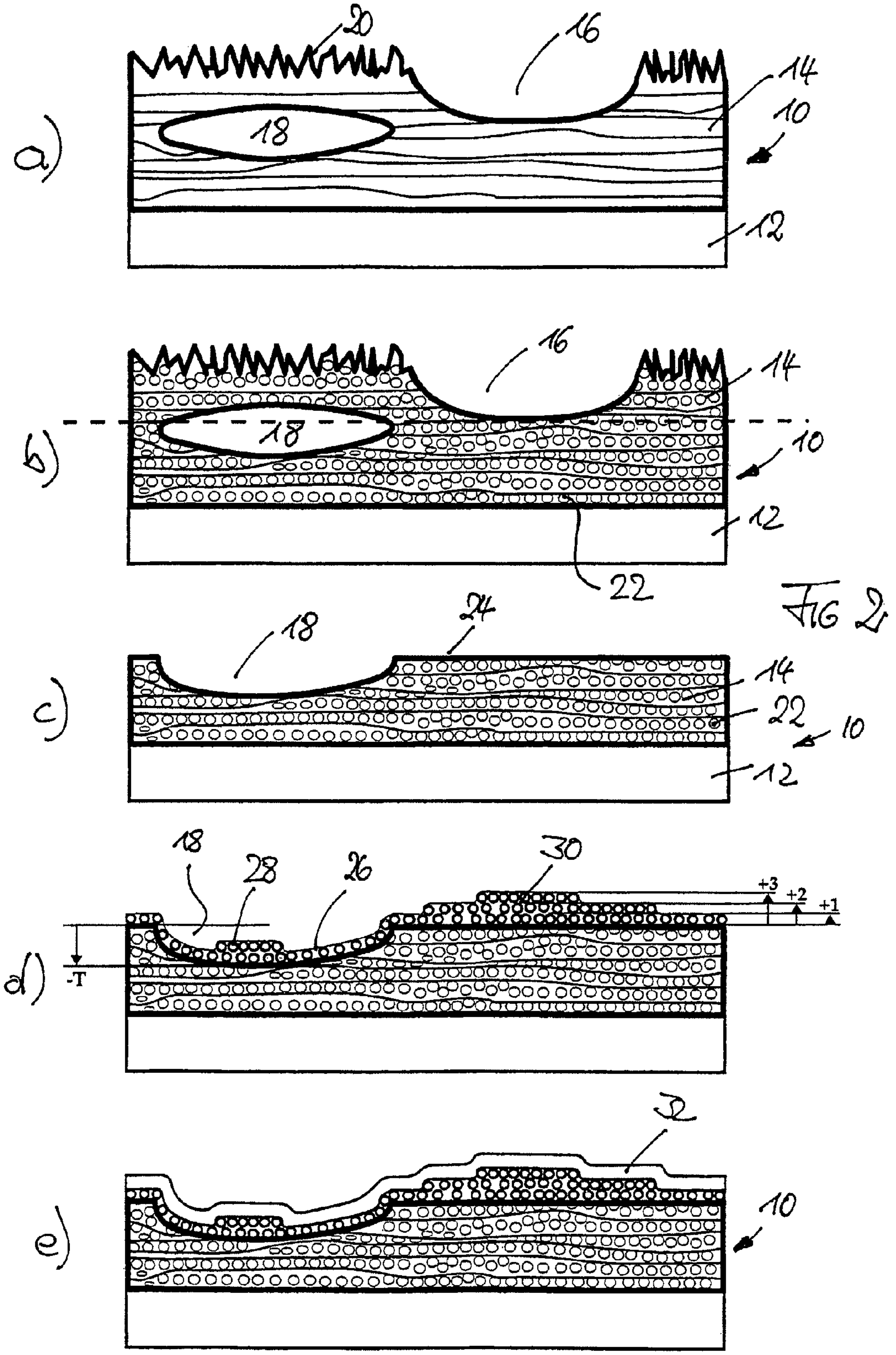
FIG. 2 Cross sections through a component according to the invention to explain individual processing steps.

FIG. 2 shows diagrammatically a cross section through a component in various processing steps explained above.

A component labeled overall by 10 contains a base body 12, onto which a veneer 14 of timber has been applied.

FIG. 2*a* shows the base body 12 in the raw state. The veneer 14 or the timber is cut parallel to the fiber direction or grain, wherein channels run parallel to the grain as well as perpendicular to the grain in the timber. The channels running perpendicular to the grain run in the radial direction, for example, of a trunk and serve supply in the radial direction, for example, also into branches. FIG. 2*a* shows an exposed pore 16 and a pore 18 present in the interior of the veneer 14 or a channel present in the interior, wherein both pores run perpendicular to the actual grain. Pores or channels running parallel to the grain are naturally not visible in the section direction shown.

Fibers of the timber exposed on the surface that produce a rough surface are labeled 20.

FIG. 2*b* shows the veneer 14 impregnated with a functional liquid, wherein the functional liquid 22 is symbolized by small circles. The functional liquid is adjusted such that the pores 16 and 18, which have a smaller capillarity than the finest capillary fibers of the wood itself, remain open or free from functional liquid.

Still in the wet state, but preferably after drying, the surface of the veneer 14 is finely sanded and completely freed of sanding residue, wherein the sanding depth is indicated in FIG. 2*b* by a dotted line. According to FIG. 2*c*, the component 10, with finished sanded and cleaned surface, has a flat surface 24, with the exception of the now exposed pore 18, wherein the veneer 14 is filled with the dried residue of the functional liquid so that no or only minimal quantities of further liquid can penetrate its surface.

The moistening step between fine sanding steps described above is not compulsory in the preparation of a timber surface for printing or in the preparation of an original surface for scanning in, if modern grinding machines are used.

The surface in the state according to FIG. 2*c* is now printed according to the inkjet method, wherein, as shown in FIG. 2*d*, different printing layer thicknesses result, namely a thin printing layer thickness 26 with weak coloring, an average printing layer thickness 28 with average coloring and a thick printing layer thickness 30 with strong coloring, or a thin printing layer thickness 26 if only one of the basic colors of the inkjet method is necessary, an average printing layer thickness 28 with two basic colors applied onto the same surface elements and a thick printing layer thickness 30 with three basic colors. If work is carried out with four basic colors, a still thicker printing layer results accordingly.

Preferably the surface is printed such that the maximum printing layer thickness is smaller than the largest depth of the exposed pores, which is labeled by −T in FIG. 2*d*. In this manner the three-dimensionality of the surface of the component 10 is retained with inkjet printing.

FIG. 2*e* shows the printed component 10 according to FIG. 2*d* with an additional cover layer 32 which likewise can be applied in the inkjet method or according to another method and, for example, forms a hard protective layer, which additionally protects against effects of ultraviolet light or chemical influences. The cover layer 32 can be relatively thin, as in FIG. 2*e*, so that it does not change the three-dimensionality of the surface. It can also be so thick that it covers the three-dimensionality and is flat, which is desirable for glossy surfaces. Surfaces of this type also produce a three-dimensional impression when viewed accordingly.

After being printed, the surface of the sample pattern M is recorded in the recording station N, for example, as the color values of the customer-request original A are recorded in the color recording station F, and are compared in the electronic data processing system H with the color values of the customer-request original A. In the event of a deviation, the data record can be modified accordingly to control the inkjet printing device L, so that a new sample can be printed. As soon as the concordance between the appearance of the surface of a printed sample pattern with the appearance of the customer-request original A is satisfactory, the control data record is established for controlling the inkjet printing device L.

Figure 3:
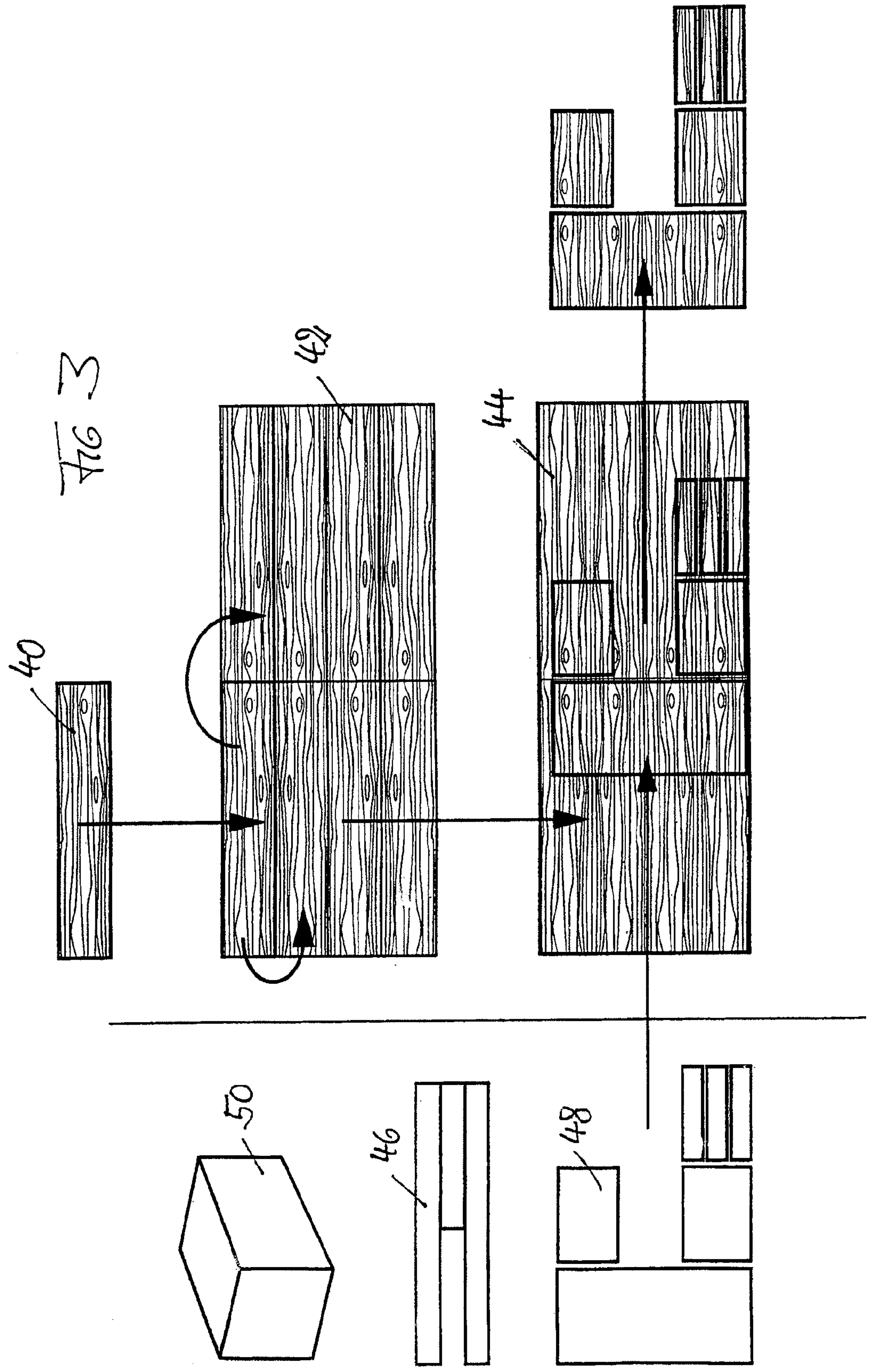
FIG. 3 A diagrammatic representation to explain the generation of a data record for printing a large area from a basic data record.

The desired wood pattern data records B or a data record such as is used to produce a sample pattern M is initially often suitable only for printing a predetermined limited area. When large areas are to be printed, it is necessary to generate a data record from a data record of this type, with which a sufficiently large area can be printed according to the inkjet method. This is explained below based on FIG. 3, in which 40 is used to label a basic data record, which is suitable for printing an area given thereby, in the example shown, a rectangle. The basic data record is preferably a data record essentially containing only the grain of the desired wood. In order that a data record 42 with an extension of any desired size can be produced with the basic data record 40, which has a predetermined limited area, the basic data record 40 is respectively mirrored and joined with the mirrored basic data records such that respectively constant grain transitions are achieved at the edges, producing the effect that the entire grain of the data record 42 has been obtained from a single wood surface.

When areas are to be printed which are larger than the area to be printed with the basic data record 40, the color processing of the basic data record is carried out only after production of the large-area data record 42, since otherwise constant transitions are not ensured at the edges of the mirrored basic data records.

With the large-area data record 42, for which color processing has been completed, a large-area plate 44 can be printed, which was pretreated in the pretreatment station D as described. From the large-area plate 44, individual parts can be assembled in the assembly station N (FIG. 1), for example, parquet elements 46, kitchen cabinet front elements 48, etc. The assembly can be carried out directly according to customer requests. The assembled units can create the effect that they all come from the same piece of wood, which gives them an aesthetically unique, valuable and attractive appearance. The large-area data record 42 can also be used for printing the surfaces of blocks 50 or other three-dimensional components, wherein the surfaces of the different sides merge constantly into one another.

| List or reference numbers | |
|---|---|
| 10 | Component |
| 12 | Base body |
| 14 | Veneer |
| 16 | Pore |
| 18 | Pore |
| 20 | Fiber |
| 22 | Functional liquid |
| 24 | Surface |
| 26 | Thin printing layer thickness |
| 28 | Average printing layer thickness |
| 30 | Thick printing layer thickness |
| 32 | Cover layer |
| 40 | Basic data record |
| 42 | Data record |
| 44 | Plate |
| 46 | Parquet element |
| 48 | Kitchen cabinet element |
| 50 | Block |
| A | Customer request original |
| B | Desired wood pattern data records |
| C | Timber store |
| D | Pretreatment station |
| E | Scanning station |
| F | Color recording station |
| H | Electronic data processing system |
| K | Control device |
| L | Inkjet printing device |
| M | Sample pattern |
| N | Assembly station |

The invention claimed is:

1. A method for producing a component with a real-wood surface, the method comprising:

supplying an original;

inputting, into an electronic data processing system, original data related to an appearance of a surface of the original, wherein the appearance of the surface of the original describes a predetermined type of wood;

supplying a component having a timber surface with a pore structure corresponding to that of the predetermined type of wood; and printing on the timber surface using an inkjet printing method in accordance with the original data such that a three-dimensional surface structure of the timber surface determined by the pore structure is at least partly retained, whereby the printed on timber surface is the real-wood surface, which has the appearance of the surface of the original printed on the timber surface, and has a grain and the pore structure corresponding to the predetermined type of wood and a predetermined coloration.

2. The method according to claim 1, wherein the inputting comprises:

scanning the surface of the original into the electronic data processing system to determine scanned-in data;

recording reference values of the surface of the original; and processing the reference values in the electronic data processing system together with the scanned-in data to create control data for the printing.

3. The method of claim 2, wherein the scanned-in data comprises halftones and mid-tones of the surface of the original.

4. The method according to claim 1, further comprising producing a desired wood pattern data record, which comprises:
- providing a desired wood pattern with a surface of the predetermined type of wood;
- scanning the surface of the of the desired wood pattern into the electronic data processing system to determine scanned-in data;
- recording reference values of the surface of the desired wood pattern; and
- processing the reference values in the electronic data processing system together with the scanned-in data to create control data for the printing.

5. The method of claim 4, wherein the scanned-in data comprises reference tone values including halftones and mid-tones of the surface of the desired wood pattern.

6. The method of claim 5, further comprising:
- finely sanding the surface of the desired wood pattern; and
- removing sanding residue after the sanding and before the scanning such that a three-dimensional surface structure of the surface of the surface of the desired wood pattern is exposed.

7. The method of claim 6, wherein the fine sanding is carried out in several sanding steps, and further comprising moistening the surface of the desired wood pattern between the several sanding steps.

8. The method of claim 1, further comprising:
- producing a data record for printing a larger area from a basic data record for printing a surface of predetermined size by rotating and/or mirroring the basic data record and lining up the rotated and/or mirrored basic data records.

9. The method of claim 1, further comprising:
- recording reference tone values of a printed pattern of the printed on timber surface;
- comparing the reference tone values of the printed pattern of the printed on timber surface to reference tone values of the surface of the original; and
- modifying data used to control the printing when the comparing reveals a deviation of the reference tone values of the printed pattern of the printed on timber surface from the reference tone values of the surface of the original.

10. The method of claim 1, wherein the timber surface is a surface of a cut veneer or peeled veneer.

11. The method of claim 1, wherein the timber surface comprises a base tone that is not darker than a base tone of the predetermined type of wood.

12. The method of claim 1, further comprising inserting a functional liquid into the timber surface before the printing such that the three-dimensional surface structure of the timber surface is retained.

13. The method of claim 12, wherein the functional liquid provides the timber surface with at least one of: an increased pressure load capacity; a resistance to biotic factors; a resistance to chemical effects; a stability with respect to UV radiation; a reduction of hygroscopic properties; a reduction of shrinkage; an improvement of elasticity; and a lightening of the timber surface.

14. The method of claim 12, further comprising drying the timber surface before and after the inserting of the functional liquid.

15. The method of claim 12, further comprising brushing or sandblasting the timber surface before the inserting of the functional liquid.

16. The method of claim 1, further comprising:
- finely sanding the timber surface; and
- removing sanding residue after the sanding and before the printing so that a three-dimensional surface structure of the timber surface is exposed.

17. The method of claim 16, wherein the fine sanding is carried out in several sanding steps, and further comprising moistening the timber surface between the several sanding steps.

18. The method of claim 1, further comprising identifying the predetermined type of wood based upon the appearance of the surface of the original.

19. The method of claim 1, wherein the component having the timber surface, while having a similar pore structure, is a type of wood different from the predetermined type of wood.

20. A method for producing a component with a real-wood surface, the method comprising:
- identifying a predetermined type of wood based upon an appearance of a surface of an original wood sample;
- supplying a component with a timber surface having a pore structure corresponding to that of the predetermined type of wood; and
- printing on the timber surface, via an inkjet printing method, at least a grain and coloration corresponding to the surface of the original wood sample so that a three-dimensional surface structure of the pore structure of the component is at least partly retained,
- whereby the printed on timber surface has a grain and coloration corresponding to the original wood sample.

21. The method of claim 20, wherein the component with the timber surface is a type of wood different from the predetermined type of wood.

* * * * *